United States Patent
Rom et al.

(10) Patent No.: US 9,474,977 B2
(45) Date of Patent: Oct. 25, 2016

(54) METHOD AND APPARATUS FOR CONFIGURING A GAMING ACCESSORY

(71) Applicant: STEELSERIES ApS, Valby (DK)

(72) Inventors: Kim Rom, Chicago, IL (US); Jeffrey Nicholas Mahlmeister, Chicago, IL (US); Jacob Wolff-Petersen, Richmond (GB); Bruce Hawver, Hawthorn Woods, IL (US); Francis Arnold Grever, Palatine, IL (US); Tino Soelberg, Copenhagen (DK); Christopher John Nicolella, Elk Grove Village, IL (US)

(73) Assignee: STEELSERIES ApS, Valby (DK)

( * ) Notice: Subject to any disclaimer, the term of this patent is extended or adjusted under 35 U.S.C. 154(b) by 199 days.

(21) Appl. No.: 13/789,165

(22) Filed: Mar. 7, 2013

(65) Prior Publication Data

US 2014/0256437 A1 Sep. 11, 2014

(51) Int. Cl.

| | |
|---|---|
| A63F 13/06 | (2006.01) |
| A63F 13/77 | (2014.01) |
| A63F 13/35 | (2014.01) |
| A63F 13/22 | (2014.01) |
| A63F 13/79 | (2014.01) |

(52) U.S. Cl.
CPC .............. *A63F 13/77* (2014.09); *A63F 13/22* (2014.09); *A63F 13/35* (2014.09); *A63F 13/79* (2014.09)

(58) Field of Classification Search
USPC ......................................... 463/36, 37, 39, 40
See application file for complete search history.

(56) References Cited

U.S. PATENT DOCUMENTS

| | | | |
|---|---|---|---|
| 7,925,797 B2 | 4/2011 | Wolff-Petersen | |
| 8,108,566 B2 | 1/2012 | Wolff-Petersen | |
| 8,281,046 B2 | 10/2012 | Wolff-Petersen | |
| 8,341,305 B2 | 12/2012 | Wolff-Petersen | |
| 2006/0084504 A1* | 4/2006 | Chan et al. | 463/39 |
| 2009/0075687 A1* | 3/2009 | Hino et al. | 455/517 |
| 2010/0227682 A1* | 9/2010 | Reville et al. | 463/29 |
| 2011/0021143 A1* | 1/2011 | Kapur et al. | 455/41.2 |
| 2011/0113485 A1* | 5/2011 | Little et al. | 726/19 |
| 2012/0311458 A1 | 12/2012 | Wolff-Petersen et al. | |
| 2013/0079154 A1 | 3/2013 | Wolff-Petersen | |

OTHER PUBLICATIONS

"Join millions of players online and discover the most EPIC gaming experiences . . . ever!", http://us.battle.net/en/, Dec. 29, 2011, 2 pages.
"Welcome to the ESL!", http://www.esl.eu/, Dec. 29, 2011, 2 pages.
"World Cyber Games 2011 Grand Finals", http://www.hltv.org/, Dec. 29, 2011, 2 pages.

* cited by examiner

*Primary Examiner* — Paul A D'Agostino
*Assistant Examiner* — Brandon Gray
(74) *Attorney, Agent, or Firm* — Guntin & Gust, PLC; Atanu Das (57) ABSTRACT

The subject disclosure includes a method for detecting a transferee gaming accessory, presenting a user interface providing a plurality of selectable gaming configurations, detecting a selection of a gaming configuration from the plurality of selectable gaming configurations, accessing the gaming configuration, facilitating a peer-to-peer communication session with the transferee gaming accessory, and transmitting the gaming configuration to the transferee gaming accessory to configure the transferee gaming accessory. Additional embodiments are disclosed.

20 Claims, 12 Drawing Sheets

METHOD AND APPARATUS FOR CONFIGURING A GAMING ACCESSORY

FIELD OF THE DISCLOSURE

The present disclosure relates generally to a method and apparatus for configuring a gaming accessory.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

A gaming accessory typically can be configured in a variety of ways using different device settings. Configuration for optimum performance generally varies with the accessory being used, the game being played, and the user's preferences.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for collecting, processing, cataloguing and presenting performances of gamers. Other embodiments are contemplated by the subject disclosure.

One embodiment of the present disclosure can entail a method for accessing, by a computing device comprising a processor, a configuration of a transferor gaming accessory, copying, by the computing device, the configuration to the computing device, storing, by the computing device, the configuration at a storage device, detecting, by the computing device, a transferee gaming accessory, and transmitting, by the computing device, the configuration to the transferee gaming accessory to configure the transferee gaming accessory. The computing device executes a first component of an accessory management application for managing use of gaming accessories. The first component of the accessory management application generates a presentation of a user interface for facilitating the accessing of the configuration, while the transferee gaming accessory executes a second component of the accessory management application to facilitate receiving the configuration from the computing device.

One embodiment of the present disclosure can entail a computing device including a memory to store instructions, and a processor coupled to the memory. Execution of the instructions by the processor, causes the processor to perform operations including accessing a first gaming configuration and a second gaming configuration stored by a remote server, facilitating a peer-to-peer communication session with a first gaming accessory and a second gaming accessory by way of a local network, and transmitting the first gaming configuration to the first gaming accessory and the second gaming configuration to the second gaming accessory to configure the first gaming accessory and the second gaming accessory for a video game session.

One embodiment of the present disclosure can entail a computer-readable storage device including instructions which, when executed by a processor of a transferor gaming accessory, cause the processor to perform operations including detecting a transferee gaming accessory, presenting a user interface providing a plurality of selectable gaming configurations, detecting a selection of a gaming configuration from the plurality of selectable gaming configurations, accessing the gaming configuration, facilitating a peer-to-peer communication session with the transferee gaming accessory, and transmitting the gaming configuration to the transferee gaming accessory to configure the transferee gaming accessory.

Figure 1:
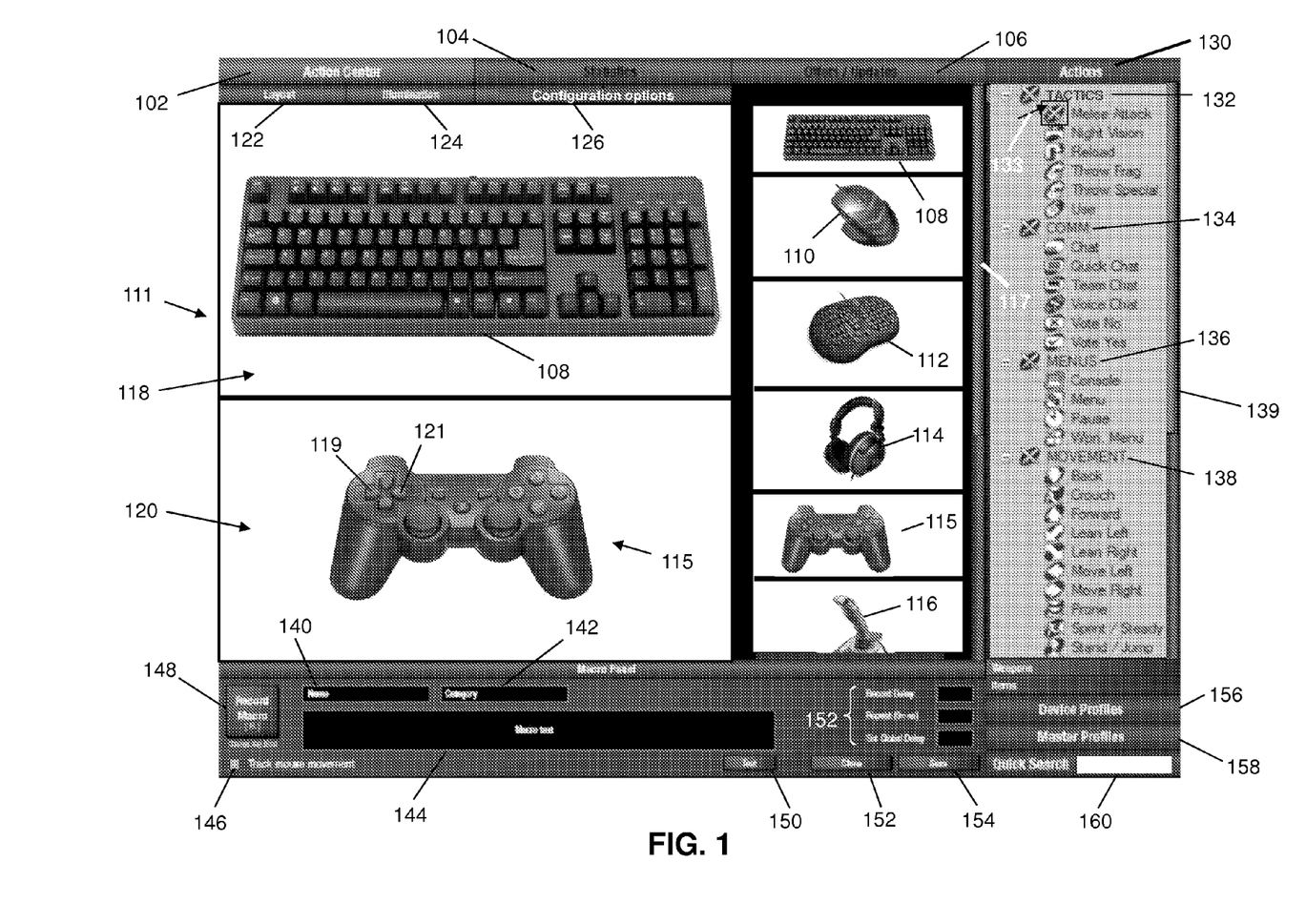
FIG. 1 depicts an illustrative embodiment of a Graphical User Interface (GUI) generated by an Accessory Management Software (AMS) application according to the present disclosure.

FIG. 1 depicts an illustrative embodiment of a Graphical User Interface (GUI) 111 generated by an Accessory Management Software (AMS) application. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). An accessory can represent any type of device which can be communicatively coupled to the computing device (or an integral part of the computing device) and which can control aspects of the OS and/or a software application operating in the computing device. It is contemplated that the AMS application can be executed by any device with suitable computing resources.

The term "gaming system," as used herein, refers to the combination of computing hardware and software that delivers the gaming experience. The software applications that present and manage the gaming experience are collectively referred to herein as the "gaming engine." The gaming engine can include the Accessory Management Software for controlling the various accessories, and/or an Application Program Interface (API) for receiving feedback from a gaming application such as a video game.

Figure 2A:
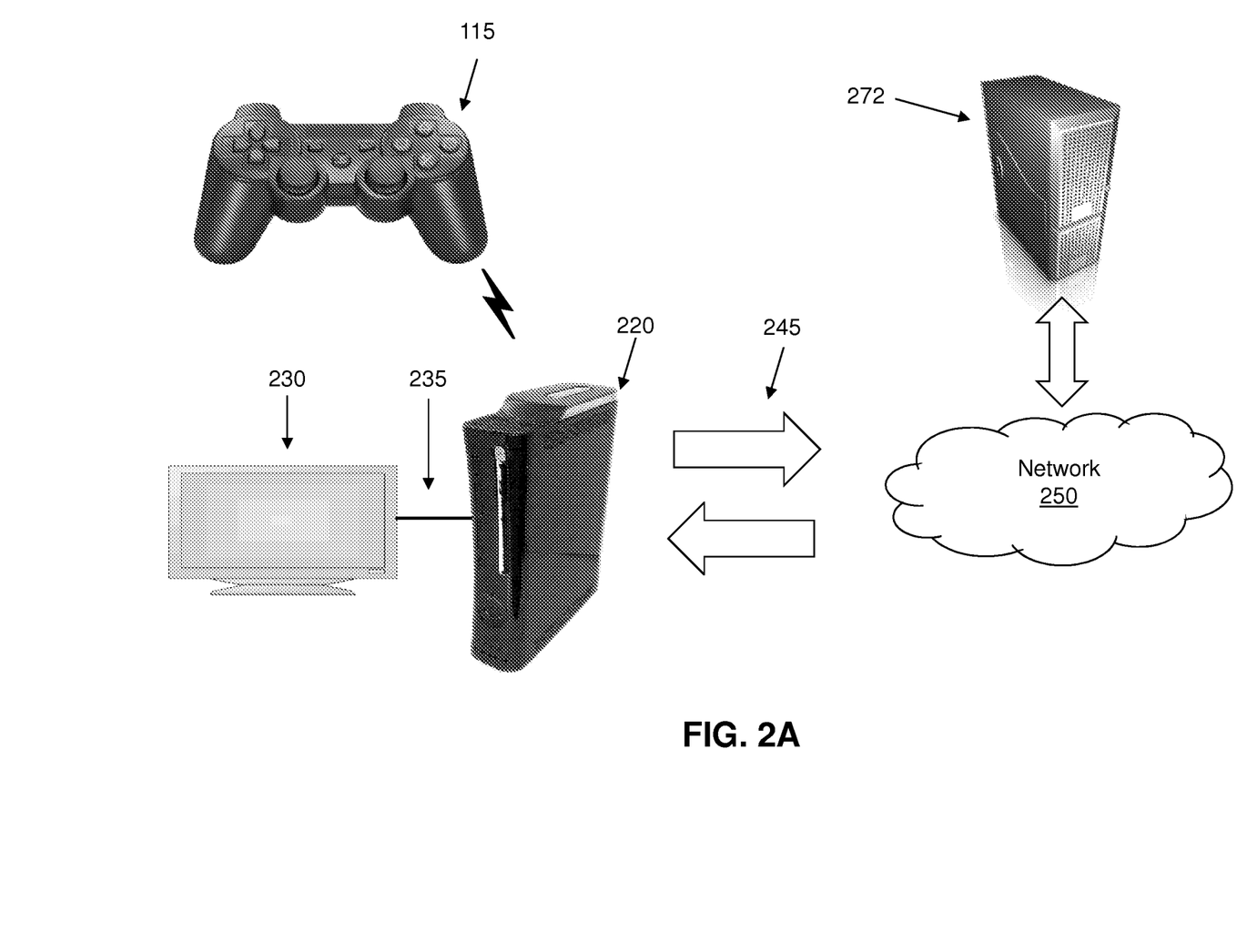
FIGS. 2A and 2B depict illustrative embodiments for communicatively coupling a gaming controller to a computing device.

FIG. 2A schematically depicts a gaming controller 115 which can be used by a gamer, according to an embodiment of the disclosure. In this embodiment, gaming controller 115 and gaming console 220 have an integrated wireless interface for wireless communications therebetween (e.g., WiFi, Bluetooth, ZigBee, or proprietary protocol). The gaming console 220 is coupled to network 250 via communication link 245, such as a WiFi link, to the internet. The gaming console 220 can be, for example, an Xbox™, a PS3™, a Wii™, or another suitable gaming console device. Video information is displayed to the gamer on display device 230, which in this illustration is coupled to gaming console 220 by a wired connection 235 (e.g., HDMI connection). Display device 230 may be a television or a touch screen so that it comprises both an input device and an output device for the online game. Alternatively, the gaming controller 115 can be tethered to a computing device such as the gaming console by a cable (e.g., USB cable) to provide a means of communication less susceptible to electromagnetic interference or other sources of wireless interference.

Figure 2B:
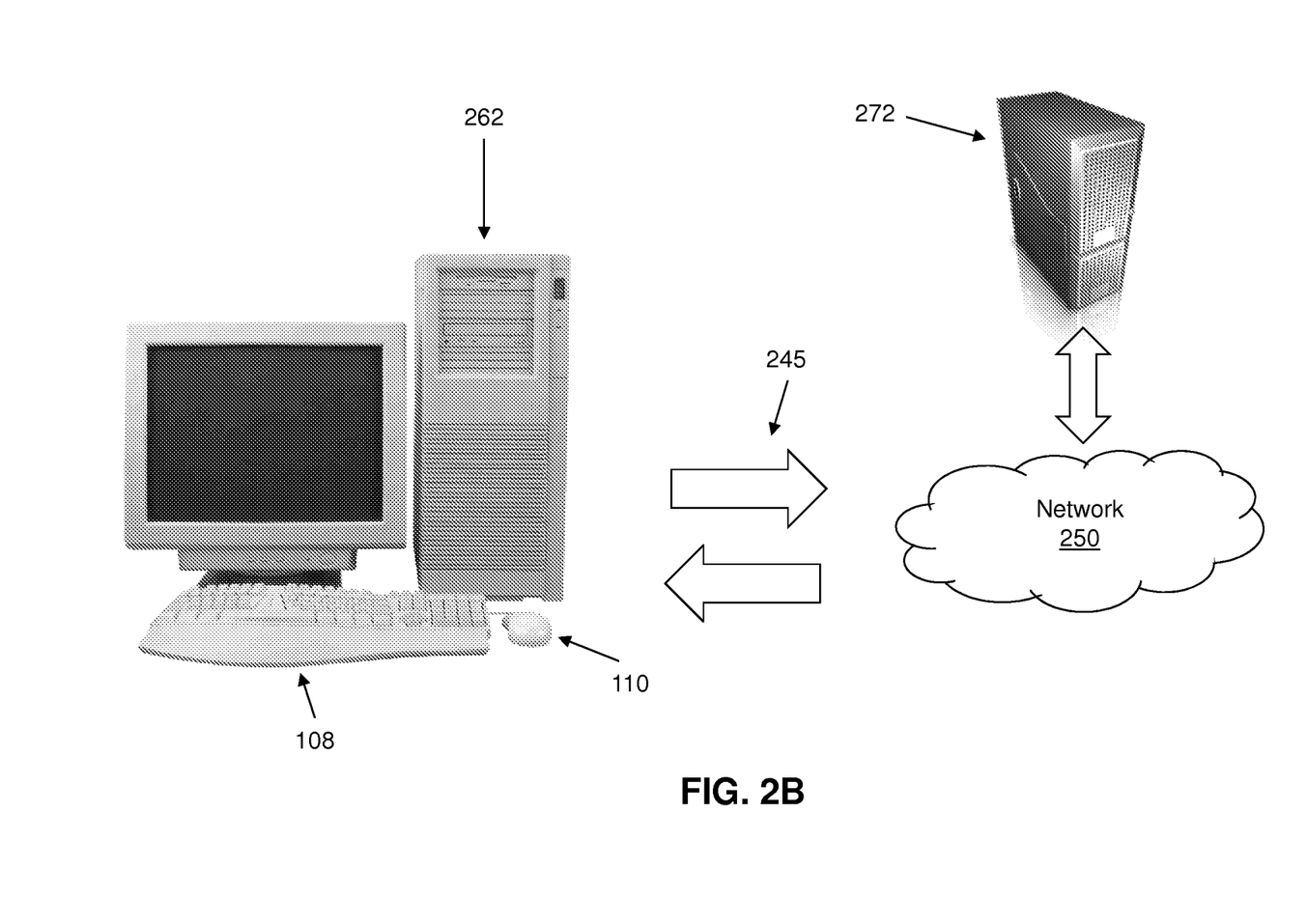

It is to be understood that the devices shown in FIG. 2A are merely illustrations of a wide variety of computing devices or other components that may be used in a video game, including an online game operated by an on-line gaming server 272. For instance, in FIG. 2B a desktop computer 262 can be used in place of the gaming console 220. The desktop computer 262 can be configured to execute a gaming client (e.g., a software application) acting in cooperation with the on-line gaming server 272 accessible by the desktop computer 262 via the network 250 to present an on-line game (e.g., World of Warcraft™). The gaming accessory used with the desktop computer 262 can be a keyboard 108, mouse 110, or another suitable gaming accessory device.

Figure 3:
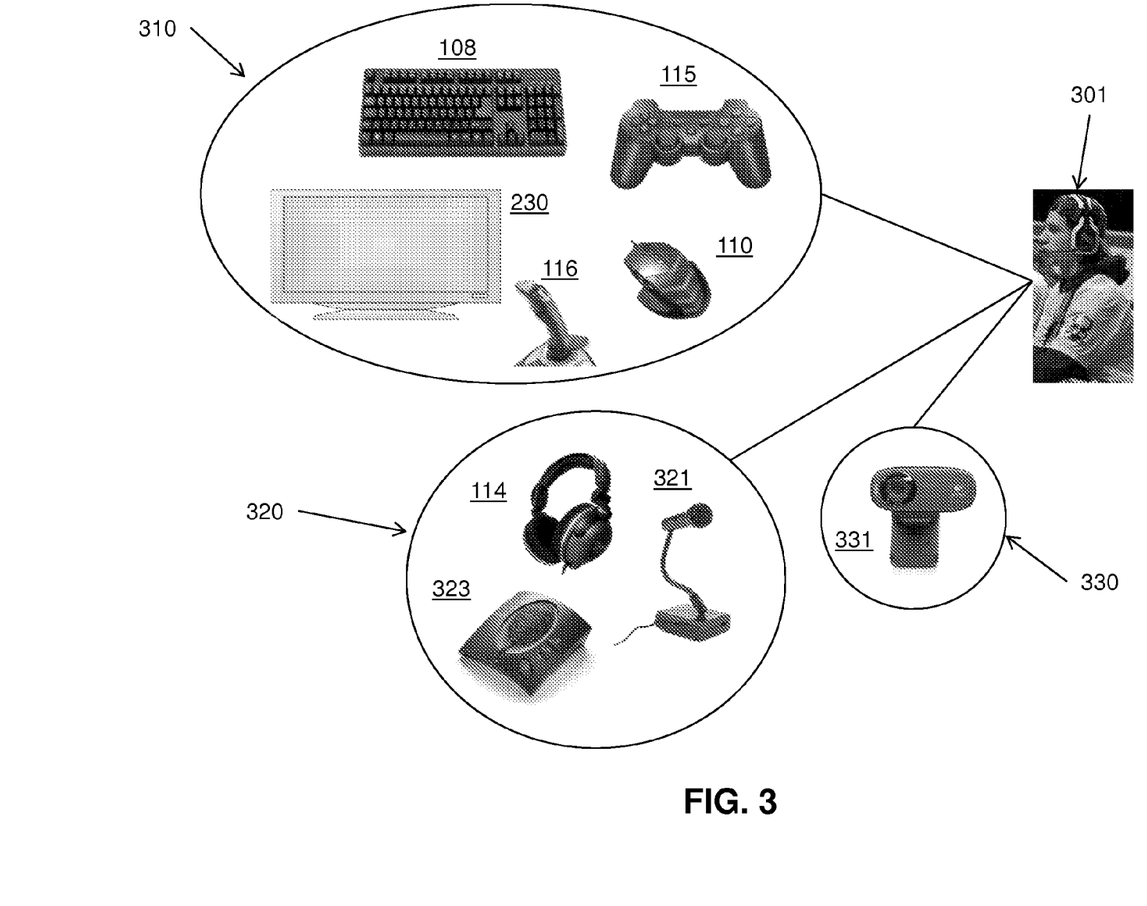
FIG. 3 schematically illustrates gaming accessories that can be used by a gamer and provide stimuli to the gamer.

FIG. 3 illustrates gaming accessory devices with which a gamer 301 can interact. Touch-sensitive devices 310 can include a game controller 115, mouse 110, keyboard 108, a display 230 (which may be touch-screen capable), and joystick 116. Audio devices 320 can include headphones 114, microphone 321, and speakerphone 323. Imaging devices 330 can include webcam 331. These accessory devices can provide sensory stimuli to the gamer, receive responses from the gamer, or both.

The accessories can be coupled to the computing device by a tethered interface (e.g., USB cable), a wireless interface (e.g., Bluetooth or Wireless Fidelity—WiFi), or combinations thereof.

Figure 4A:
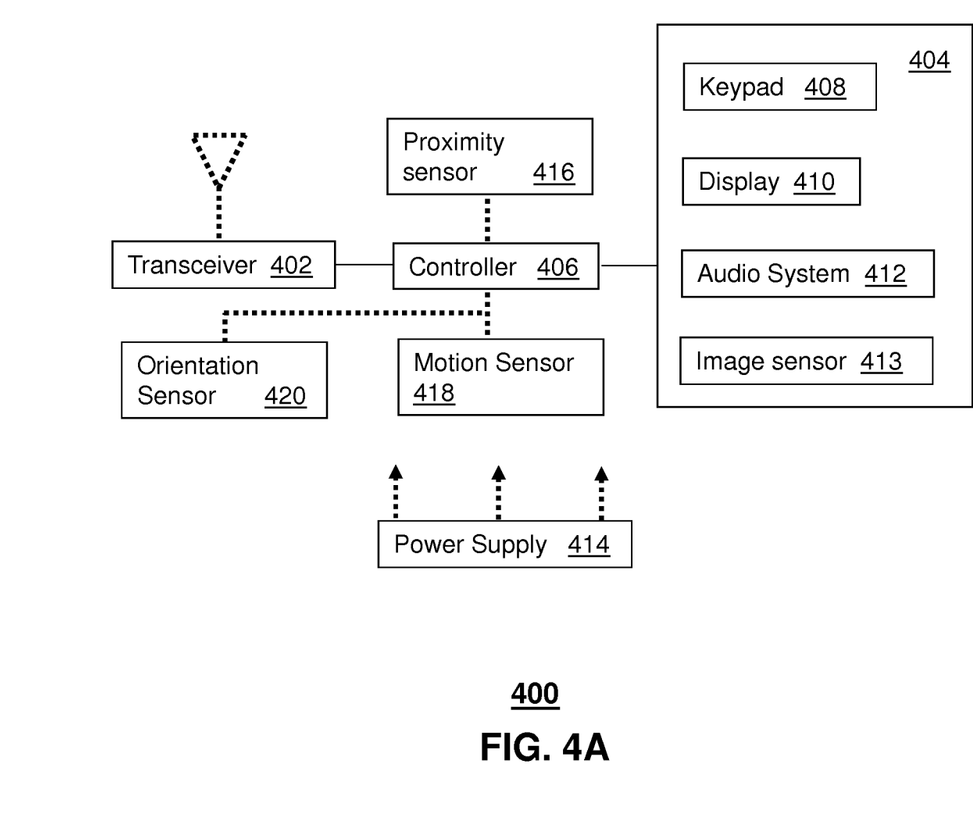
FIG. 4A depicts an illustrative embodiment of a communication device.

FIG. 4A depicts an illustrative embodiment of a computing device 400. Computing device 400 can serve in whole or in part as an illustrative embodiment of the devices depicted in FIGS. 1-3. The computing device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the computing device 400. The keypad 408 can be an integral part of a housing assembly of the computing device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the computing device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the computing device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the computing device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the computing device 400 in three-dimensional space. The orientation sensor 420 can utilize orientation sensing technology such as a magnetometer to detect the orientation of the computing device 400 (North, South, West, East, combined orientations thereof in degrees, minutes, or other suitable orientation metrics).

The computing device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies. The computing device 400 as described herein can operate with more or fewer components than described in FIG. 4A to accommodate the implementation of the devices described by the present disclosure. These variant embodiments are contemplated by the present disclosure.

Figure 4B:
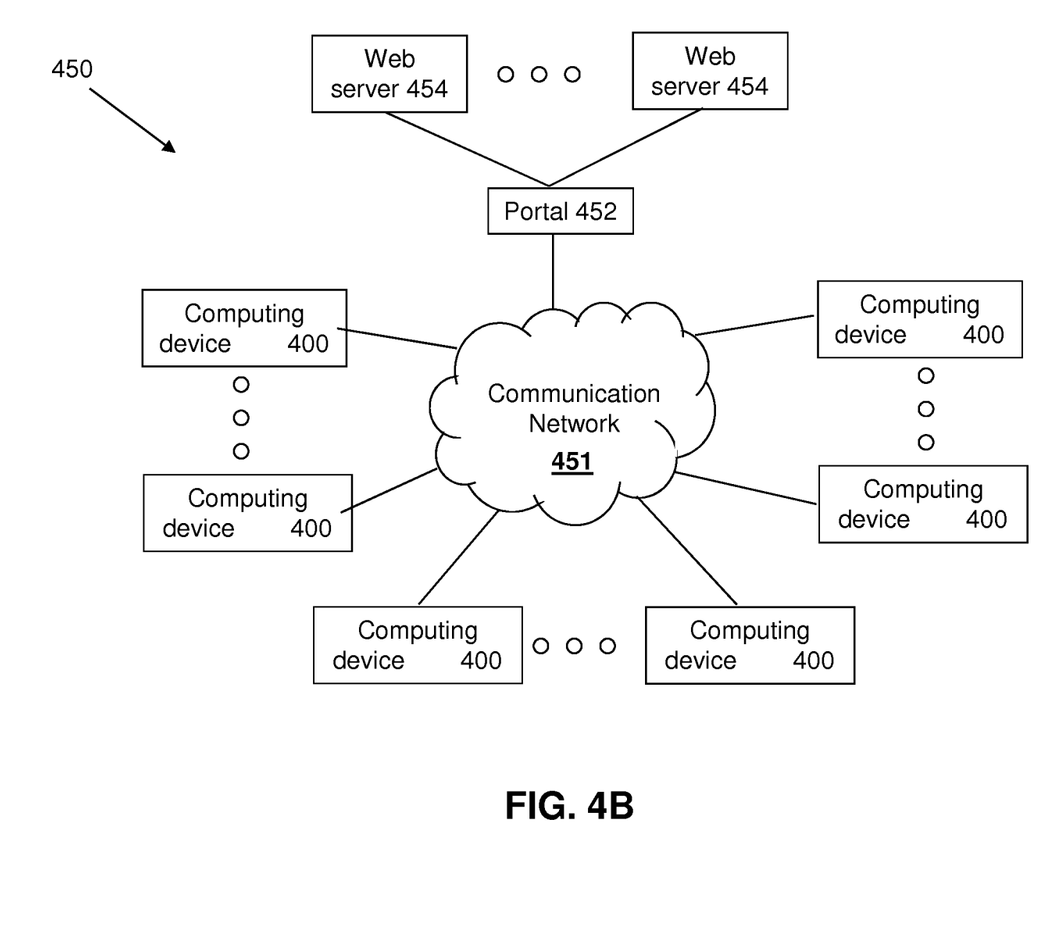
FIG. 4B schematically illustrates computing devices communicating via a network.

FIG. 4B depicts an illustrative embodiment of a communication system 450 from which the computing device 400 can operate. The communication system 450 can comprise a portal 452 operating from one or more web servers 454. The portal 452 can be communicatively coupled to a plurality of computing devices 400 representing any of the aforementioned embodiments of the devices depicted in FIGS. 1-3. The computing devices 400 can exchange messages with the portal 452 by way of the communication network 451 which can utilize circuit-switching technology and/or packet-switching technology to support communication sessions therebetween. The circuit-switching or packet-switching technologies can correspond to common wireline or wireless access technologies supportive of the access technologies previously described for the computing device 400 of FIG. 4A, as well as combinations thereof.

In accordance with an embodiment of the subject disclosure, a gaming accessory can be configured using a smart phone or other device having Internet access.

Figure 5A:
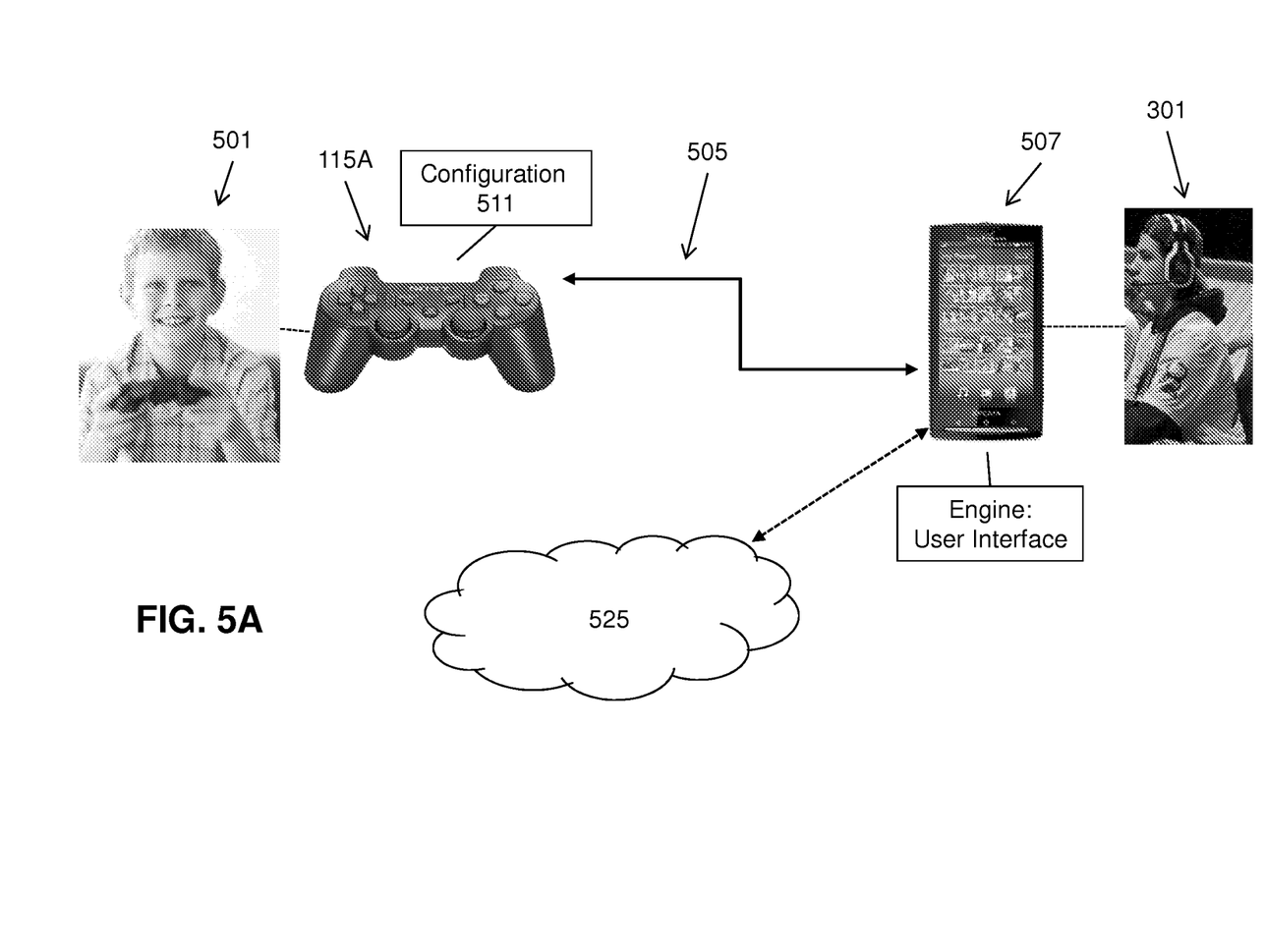
FIG. 5A schematically illustrates a peer-to-peer connection between two user devices involved in copying and transferring a gaming accessory configuration.

FIG. 5A illustrates a situation where gamer 301 has a communication device 507 (for example, a smart phone 507) with access to cloud services 525 (typically accessible through the internet). In this embodiment, the communication device 507 is a computing device that presents a graphical user interface generated by the AMS application serving in part as the gaming engine executed by the communication device 507. Gamer 501 has a gaming accessory 115A, such as one of the accessory devices discussed above with reference to FIGS. 1-3. Accessory 115A is capable of communicating with communication device 507 via a peer-to-peer communication session 505, over a local network (for example Bluetooth or WiFi) or over a wired connection (for example USB cable).

In an embodiment, the graphical user interface can be the graphical user interface discussed above with reference to FIG. 1, generated by the AMS application running on the communication device 507.

Figure 5B:
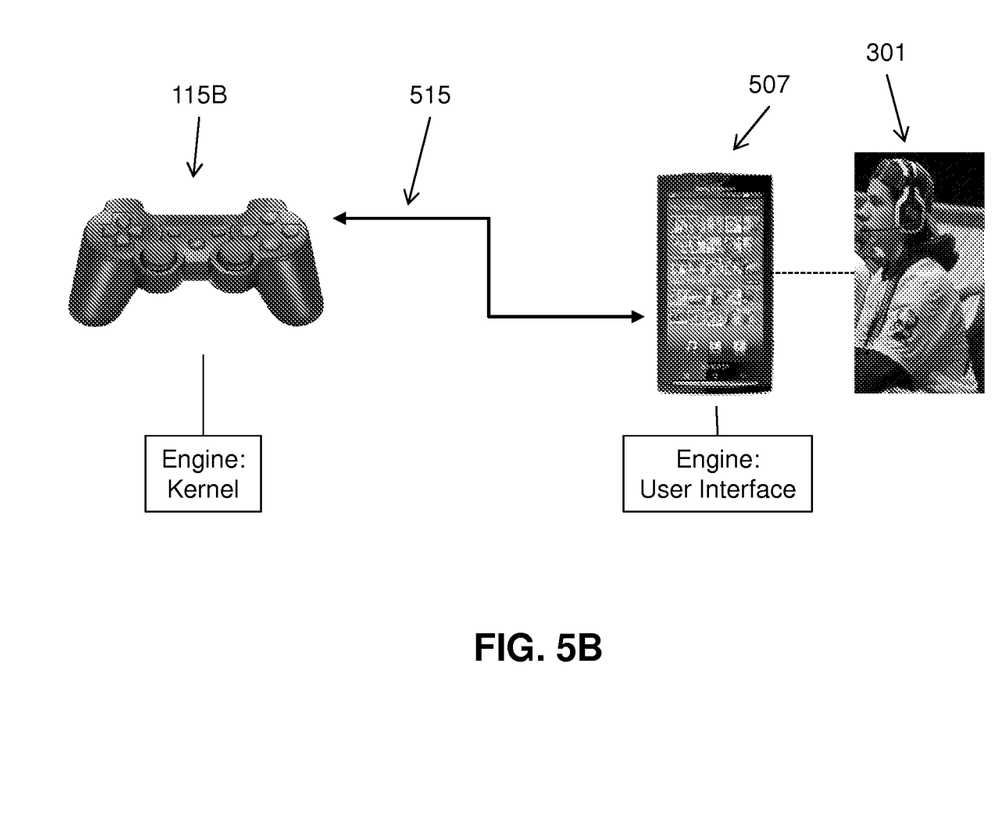
FIG. 5B schematically illustrates configuring a gaming accessory, in accordance with an embodiment of the disclosure.

In the example shown in FIG. 5A, gamer 301 is interested in copying the configuration settings 511 of accessory 115A for use by a gaming accessory 115B of the gamer 301 (see FIG. 5B). Using communication device 507, gamer 301 can configure (or reconfigure) an accessory of his own (not shown in FIG. 5A) with the configuration settings 511 of accessory 115A. In this embodiment, gamer 301 can initiate by way of the communication device 507 a communication session 505 with the gaming accessory 115A. After a connection is established (wirelessly or by wired interface), gamer 301 initiates by way of the communication device 507 a request to transfer the configuration 511 of gaming accessory 115A to the communication device 507. The request for the configuration 511 can be received by the gaming accessory 115A over the communication session 505. The gaming accessory 115A can execute a software component of the gaming engine (e.g., a software kernel of the AMS application) to retrieve the configuration 511 from memory and supply configuration 511 to the communication device 507 responsive to receiving the request. In one embodiment, once the configuration 511 is received, the communication device 507 can store it in its local memory. In another embodiment, the communication can be configured to store the configuration 511 in cloud services 525 (that is, in storage devices managed by one or more remote servers).

Gamer 301 can then transmit the configuration 511 to his accessory 115B, using the communication device 507, over a peer-to-peer communication session 515 as shown schematically in FIG. 5B. The accessory 115B (in this example a gaming controller 115B) is network-capable (that is, capable of communicating with the communication device 507 over a local network or wired connection) and is a computing device executing a software component of the gaming engine (e.g., a software kernel of the AMS application executed by the communication device 507). The gaming engine accordingly has the user interface and kernel running on separate devices.

Figure 6:
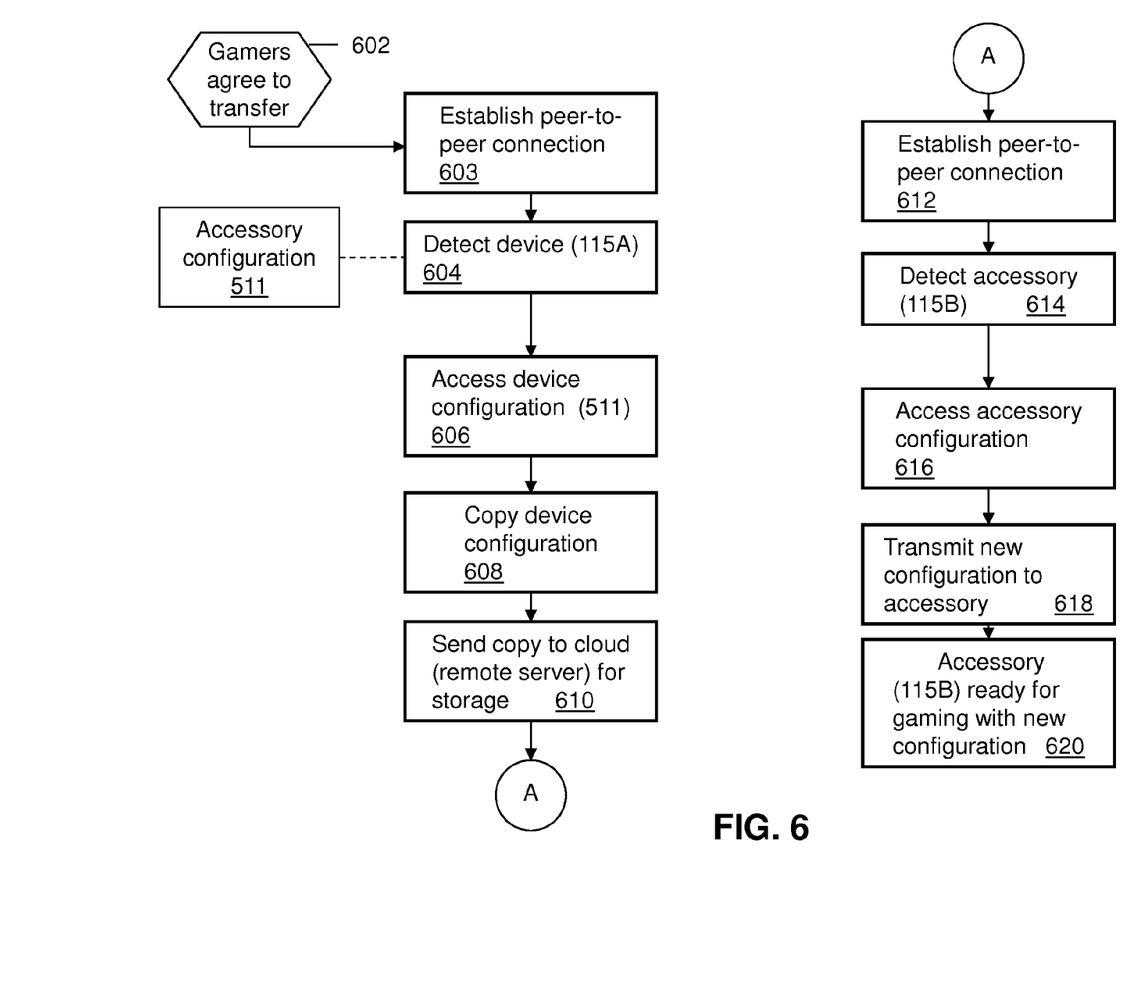
FIG. 6 is a flowchart showing steps in a method for configuring a gaming accessory, including copying a gaming accessory configuration for transfer to another user device, in accordance with an embodiment of the disclosure.

FIG. 6 is a flowchart showing steps in a method for configuring a gaming accessory using a communication device 507 (e.g., the same smart phone 507), in accordance with the embodiment shown in FIGS. 5A and 5B. It will be appreciated that communication device 507 is used as an illustration; the device used to configure the accessory can be any device having internet access and capable of storing data locally or remotely using cloud services 525 (discussed in more detail below with reference to FIG. 7A).

In the flowchart of FIG. 6, garners 301 and 501 agree to a transfer of the configuration settings 511 of accessory 115A (step 602). A peer-to-peer communication is established (step 603) between the accessory 115A of garner 501 (the transferor) and the communication device 507 of garner 301 (the transferee). Communication device 507 detects the accessory 115A to acquire access to the configuration 511 stored on the accessory (steps 604, 606). To avoid unauthorized access to the configuration settings 511 by garners not authorized by garner 501, garner 501 can lock the configuration settings 511 with an access code stored in the accessory 115A that is only known to the garner 501. The configuration settings 511 and the access code can be generated by an AMS application used by the gamer 501 when programming accessory 115A. In one embodiment, gamer 501 can verbalize the access code to gamer 301. Gamer 301 can enter the access code by way of a graphical user interface presented by the AMS application executed by the communication device 507. Once the AMS application knows the access code, a request for the configuration settings 511 can be transmitted to the gaming accessory 115A with the access code to enable the transfer. In another embodiment, the gaming accessory 115A can be configured with a two state switch or two state depressible button which the gamer 501 can mechanically switch or depress, which the software kernel of the accessory 115A can detect and responsive to the detection, enable access to the configuration settings 511 by the communication device 507 of gamer 301.

Once access to the configuration settings 511 has been enabled by gamer 301, accessory 115A transfers the configuration settings 511 to communication device 507 over communication session 505 (step 608). The communication device 507 can transmit the received configuration settings 511 for storage in the cloud services (step 610), store the configuration settings 511 in local memory, or both. In step 612, gamer 301 initiates by way of communication device 507 a communication session 515 with gaming accessory 115B (in this example, gaming controller 115B). The communication device 507 detects the accessory 115B and retrieves the configuration settings 511 stored in the communication device 507 or cloud services 525 (steps 614, 616). The configuration settings 511 are then transmitted to accessory 115B over communication session 515 (step 618). Accessory 115B is thus configured (step 620) and is ready for gaming with its new configuration.

Figure 7A:
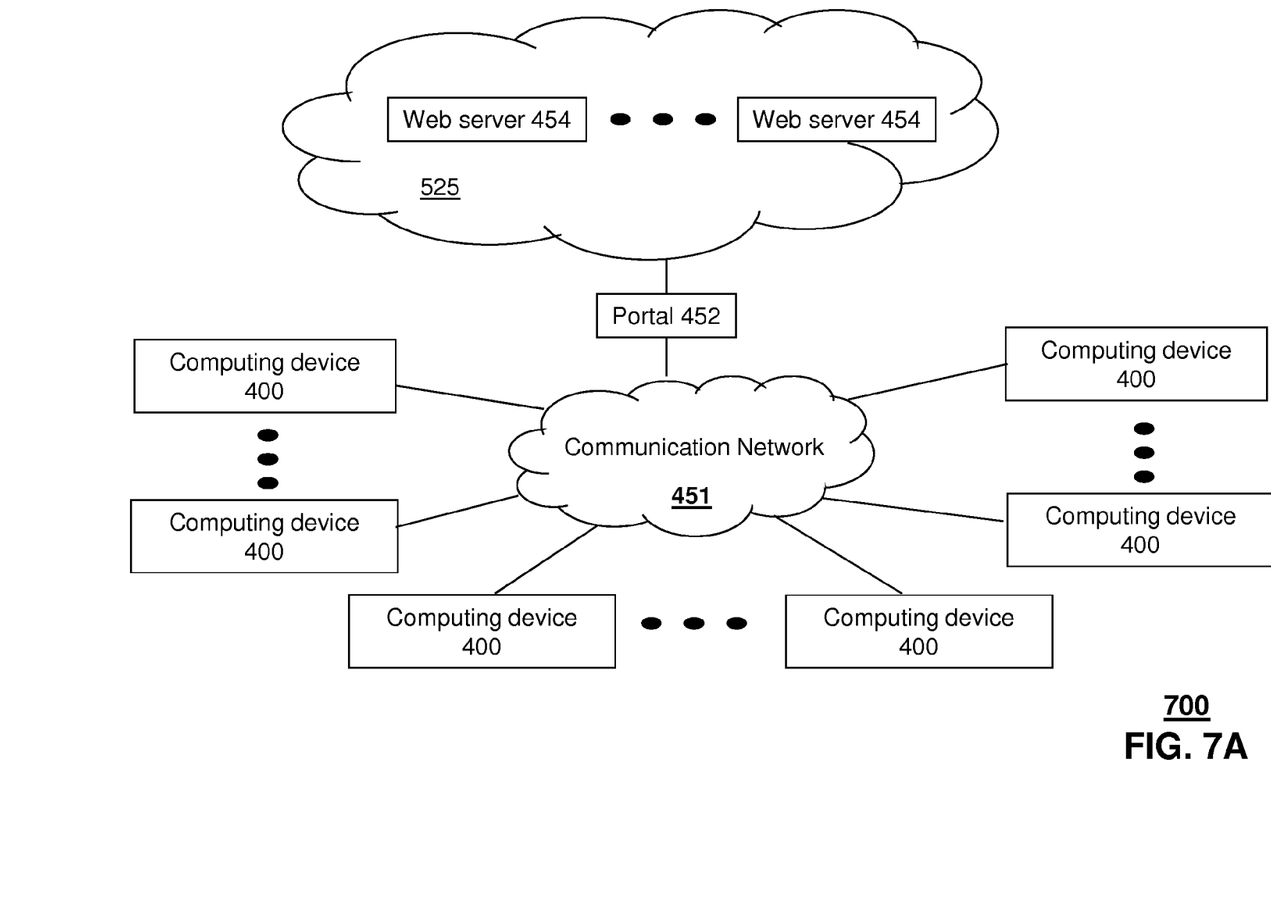
FIG. 7A depicts an illustrative embodiment of a system including computing devices and remote servers.

In one embodiment shown generally in system 700 of FIG. 7A, web server 454 can be a plurality of web servers in cloud 525. The cloud 525 can provide computing devices 400 with device configurations such as over network 451 through use of portal 452. Cloud 525 can operate by providing settings or configurations for various computing devices. For instance, a first web server 454 can provide a host device, such as a desktop computer or a mobile phone, with first settings that are compatible with the host device. A second web server 454 can provide a peripheral device, which is associated with the host device, with second settings (e.g., device configurations) that are compatible with the peripheral device and the host device to which the peripheral device is coupled. The distribution and management of configuration settings from a central location can be as described in U.S. Pat. No. 7,925,797, and U.S. Pat. No. 8,281,046, the disclosures of which are hereby incorporated by reference. The first and the second web servers 454 can be in communication with each other to coordinate the providing of the settings. For example, the first and second web servers 454 can coordinate with each other to determine the group of host device settings and the compatible group of device configurations that are to be presented for selection to the requestor. After a selection is made, the provisioning of the host device and the peripheral device can further be coordinated to facilitate delivery of the settings to the host and peripheral devices, including coordinating a communication session for delivery.

In one embodiment, the cloud services 525 can perform configuration matching between various web servers 454 to facilitate the presentation of, and/or provisioning of, settings and device configurations for host and peripheral devices. In another embodiment, the web servers 454 can be dedicated devices that are associated with different devices and/or groups of devices. For instance, a first web server 454 can be dedicated to presenting and/or provisioning settings associated with XBOX® host devices while a second web server 454 is dedicated to presenting and/or provisioning settings associated with PlayStation® host devices. In another embodiment, the web servers 454 can be dedicated based on the type of software being executed by the host device, such as the operating system, and/or by the type of peripheral device being utilized by the host device, such as joysticks or keyboards. In another embodiment, the presenting and/or provisioning of the settings and device configurations can be performed by a plurality of web servers 454, which may or may not be performed in parallel, to facilitate the process.

The web servers 454 can communicate directly with each other to facilitate the provisioning process and/or can communicate indirectly with each other, such as through a central server or through other web servers.

In one embodiment, the presentation and/or provisioning of settings and device configurations can be based on peripheral devices coupled with the host device. For example, web server 454 can download first settings to a host device when it is detected or otherwise determined that the device, such as a mobile phone, does not have a peripheral device coupled thereto. Web server 454 can download second settings and/or device configurations when it is detected or otherwise determined that the mobile phone device has a peripheral device coupled thereto. In this example, the type of peripheral device coupled with the mobile phone host device can be utilized as a factor in the selection of the second settings and/or device configurations from among a group of available settings and/or device configurations.

Figure 7B:
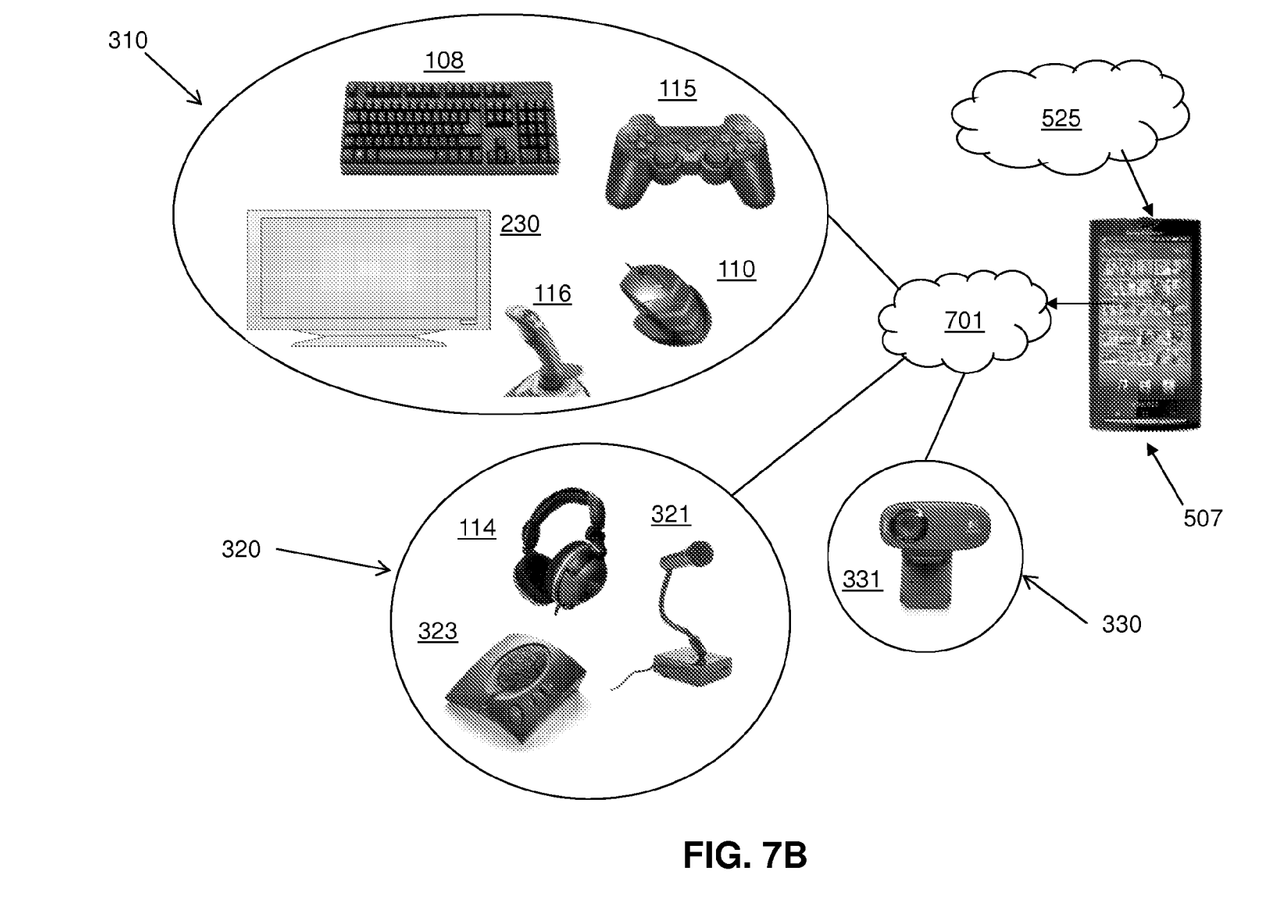
FIG. 7B schematically illustrates configuring a plurality of gaming accessories, in accordance with an embodiment of the disclosure.

In another embodiment, shown schematically in FIG. 7B, a computing device such as a smart phone 507 can be used to configure multiple accessories 310, 320, 330. These accessories generally are accessible via a gaming engine user interface running on the computing device (in this example, smart phone 507). As shown in FIG. 7B, smart phone 507 can connect with the various accessories via the local network 701 (Bluetooth, WiFi, or tethered wireline), retrieve one or more configuration settings stored in local memory of the smart phone 507 or in cloud services 525, and then transmit the configuration settings over the local network 701 to configure the one or more accessories shown. The configuration settings can be provided by other accessories as described in FIGS. 5A-5B and 6, or can be created by the user of the smart phone 507 with the AMS application. The smart phone 507 can also establish peer-to-peer communication sessions with each of the accessories being configured, the peer-to-peer communication sessions forming a local area network.

The foregoing embodiments are a subset of possible embodiments contemplated by the present disclosure. For example, the transferor gaming accessory 115A can be configured to access an internet connection by way of a wireless interface or cable interface to communicate directly with a remote server 272 (acting in the capacity of a computing device as described above). In this embodiment, gamer 501 can communicate with the remote server 272 by way of a browser interface of a communication device 507 (or other suitable internet-capable device) and submit a request by way of a graphical user interface option to access to the configuration settings 511 stored in the transferor gaming accessory 115A. The remote server 272 can access the configuration settings 511 while in communication with the transferor gaming accessory 115A with or without an access code depending on the settings established by gamer 501 when gamer 501 programmed the transferor gaming accessory 115A with the configuration settings 511. The remote server 272 can store the configuration settings 511 and download these settings to the transferee gaming accessory 115B by way of the communication device 507 or directly to the transferee gaming accessory 115B if the transferee gaming accessory 115B is internet-capable. Other suitable modifications can be applied to the present disclosure.

Figure 8:
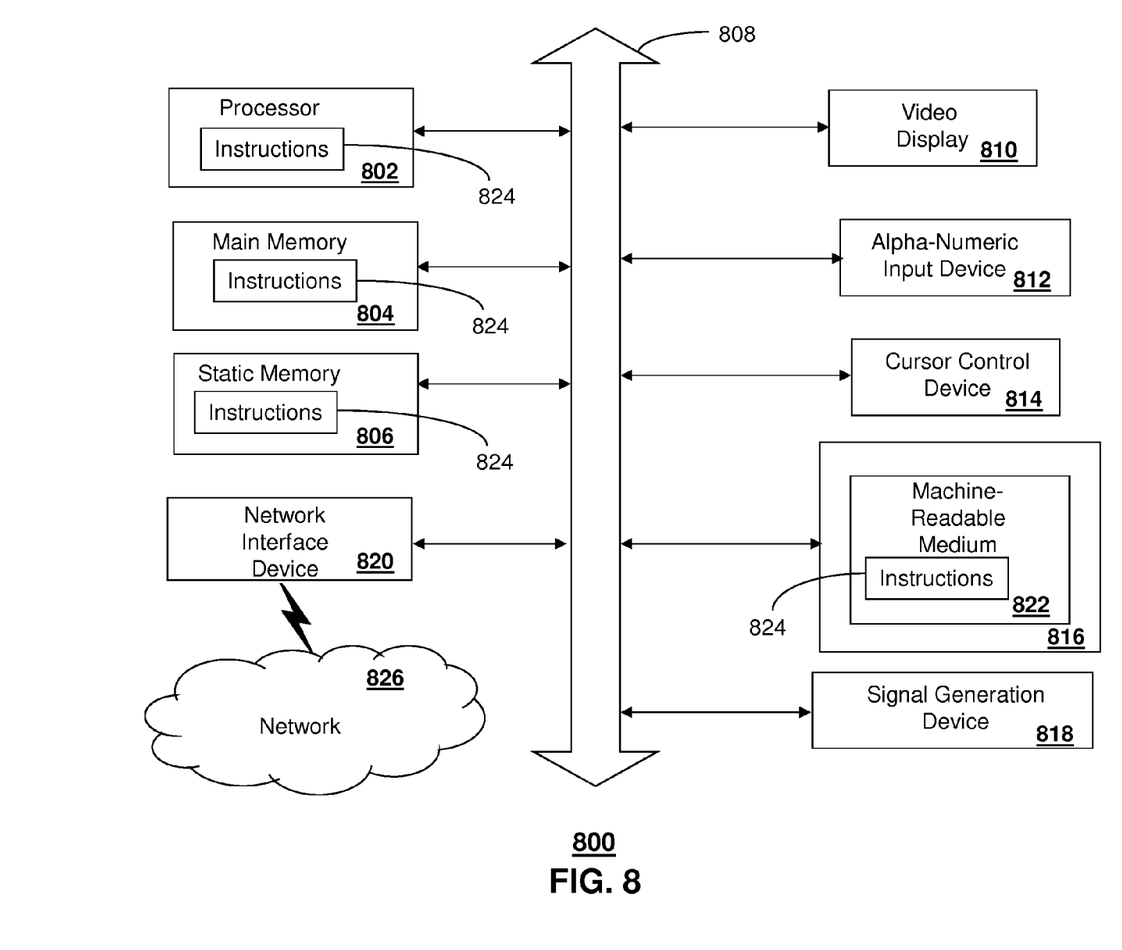
FIG. 8 depicts an illustrative diagrammatic representation of a machine in the form of a computer system within which a set of instructions, when executed, may cause the machine to perform any one or more of the methodologies disclosed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting, by a computing device comprising a processor, a configuration of a transferor gaming accessory, the computing device executing a first component of an accessory management application for managing use of gaming accessories;
   facilitating, by the computing device, a first peer-to-peer communication session between the computing device and the transferor gaming accessory;
   acquiring access, by the computing device, to the configuration of the transferor gaming accessory, wherein the first component of the accessory management application generates a presentation of a user interface for facilitating the accessing of the configuration;
   receiving, by the computing device, the configuration from the transferor gaming accessory;
   copying, by the computing device, the configuration to the computing device;
   storing, by the computing device, the configuration at a storage device;
   detecting, by the computing device, a transferee gaming accessory; and
   transmitting, by the computing device, the configuration to the transferee gaming accessory to configure the transferee gaming accessory for use in a video game session, wherein the transferee gaming accessory executes a second component of the accessory management application, wherein the second component of the accessory management application facilitates receiving the configuration from the computing device, wherein the computing device comprises a portable communication device, and wherein the video game session is initiated at a gaming server remote from the portable communication device.

2. The method of claim 1, further comprising:
   facilitating, by the computing device, a second peer-to-peer communication session with the transferee gaming accessory to transmit the configuration to the transferee gaming accessory.

3. The method of claim 1, wherein the storage device is managed by a remote server.

4. The method of claim 2, wherein the first peer-to-peer communication session or the second peer-to-peer communication session is facilitated by a local network.

5. The method of claim 1, further comprising transmitting to the transferor gaming accessory an access code to enable the computing device to access the configuration stored in the transferor gaming accessory.

6. The method of claim 1, wherein one of the transferor gaming accessory or the transferee gaming accessory comprises a gaming console controller, a computer mouse, or a keyboard.

7. The method of claim 1, wherein the computing device is an integral part of the transferor gaming accessory.

8. A computing device, comprising:
   a memory to store instructions; and
   a processor coupled to the memory, wherein execution of the instructions by the processor causes the processor to perform operations comprising:
   accessing, via a gaming engine user interface executing on the computing device, a first gaming configuration and a second gaming configuration stored by a remote server;
   facilitating a peer-to-peer communication session with a first gaming accessory and a second gaming accessory by way of a local network; and
   transmitting the first gaming configuration to the first gaming accessory and the second gaming configuration to the second gaming accessory to configure the first gaming accessory and the second gaming accessory for use in a video game session,
   wherein the computing device comprises a portable communication device, and wherein the video game session is initiated at a gaming server remote from the portable communication device.

9. The computing device of claim 8, wherein the operations further comprise:
   generating the first gaming configuration comprising first substitute gaming stimuli useable by the first gaming accessory;
   generating the second gaming configuration comprising second substitute gaming stimuli useable by the second gaming accessory; and
   providing the remote server the first and second gaming configurations for storage.

10. The computing device of claim 9, wherein the first gaming accessory generates first substitute gaming stimulations according to the first gaming configuration during the video game session, and wherein the second gaming accessory generates second substitute gaming stimulations according to the second gaming configuration during the video game session.

11. The computing device of claim 8, wherein the computing device comprises a smart phone.

12. The computing device of claim 8, wherein the operations further comprise detecting a request to initiate the video game session.

13. The computing device of claim 12, wherein the operations further comprise:
   searching for a gaming accessory; and
   detecting the first and the second gaming accessories responsive to the search.

14. The computing device of claim 12, wherein the operations further comprise:
   searching by way of the remote server an association between the first and the second gaming accessories and one or more stored configurations according to the video game session requested; and
   identifying the first and second gaming configurations based on the search.

15. The computing device of claim 8, wherein one of the first gaming accessory or the second gaming accessory comprise one of a gaming console controller, a computer mouse, or a keyboard.

16. A non-transitory computer-readable storage device comprising instructions which, when executed by a processor of a transferor gaming accessory, cause the processor to perform operations comprising:
   presenting a user interface providing a plurality of selectable gaming configurations;
   detecting a selection of a gaming configuration from the plurality of selectable gaming configurations;
   accessing the gaming configuration;
   facilitating a peer-to-peer communication session between the transferor gaming accessory and a transferee gaming accessory; and transmitting the gaming configuration to the transferee gaming accessory to configure the transferee gaming accessory for use in a video game session, wherein the transferor gaming accessory comprises a portable communication device, and wherein the video game session is initiated at a gaming server remote from the portable communication device.

17. The computer-readable storage device of claim 16, wherein the accessing of the gaming configuration comprises accessing the gaming configuration from a storage device of the transferor gaming accessory.

18. The computer-readable storage device of claim 16, wherein accessing of the gaming configuration comprises accessing the gaming configuration from a storage device of a remote server.

19. The computer-readable storage device of claim 16, wherein the peer-to-peer communication session is facilitated by a local network.

20. The computer-readable storage device of claim 16, wherein one of the transferor gaming accessory or the transferee gaming accessory comprise one of a gaming console controller, a computer mouse, or a keyboard.

* * * * *